US011461792B1

(12) United States Patent
Drozd et al.

(10) Patent No.: US 11,461,792 B1
(45) Date of Patent: Oct. 4, 2022

(54) METHOD AND SYSTEM FOR TRACKING LOCAL BUSINESSES VISITED BY A USER

(71) Applicant: BLUEOWL, LLC, San Francisco, CA (US)

(72) Inventors: Kayla Drozd, Portland, OR (US); Theobolt N. Leung, San Francisco, CA (US); Kenneth Jason Sanchez, San Francisco, CA (US)

(73) Assignee: BlueOwl, LLC, San Francisco, CA (US)

( * ) Notice: Subject to any disclaimer, the term of this patent is extended or adjusted under 35 U.S.C. 154(b) by 58 days.

(21) Appl. No.: 16/574,706

(22) Filed: Sep. 18, 2019

(51) Int. Cl.
*G06Q 30/02* (2012.01)
*G01C 21/36* (2006.01)

(52) U.S. Cl.
CPC ..... *G06Q 30/0201* (2013.01); *G06Q 30/0205* (2013.01); *G01C 21/3679* (2013.01)

(58) Field of Classification Search
None
See application file for complete search history.

(56) References Cited

U.S. PATENT DOCUMENTS

| | | | | |
|---|---|---|---|---|
| 8,620,579 | B1 * | 12/2013 | Upstill | G01C 21/3679 701/426 |
| 9,057,616 | B1 * | 6/2015 | Lopatenko | G01C 21/3679 |
| 2003/0177058 | A1 * | 9/2003 | Needham | G06Q 30/0266 705/307 |
| 2008/0051994 | A1 * | 2/2008 | Fisher | G06Q 30/02 701/414 |
| 2011/0099046 | A1 * | 4/2011 | Weiss | H04W 4/029 705/7.31 |
| 2014/0129080 | A1 * | 5/2014 | Leibowitz | G06Q 30/0631 705/26.7 |
| 2015/0204688 | A1 | 7/2015 | Gearhart et al. | |
| 2015/0278211 | A1 * | 10/2015 | Voronel | G06F 16/24578 707/728 |

(Continued)

OTHER PUBLICATIONS

Yuan, "Time-aware Point-of-Interest Recommendation," 2013, In Proceedings of the 36th international ACM SIGIR conference on Research and development in information retrieval, pp. 363-372 (Year: 2013).*

(Continued)

*Primary Examiner* — Ivan R Goldberg
(74) *Attorney, Agent, or Firm* — Faegre Drinker Biddle & Reath LLP

(57) ABSTRACT

A method and system is provided for identifying local businesses visited by a user. Location and movement data for a user is analyzed to identify points of interest (POIs) visited by a user, and POIs which were not visited while the user travelled to the visited POIs. The POIs are categorized as corresponding to local businesses or national/global businesses, and local business metrics are generated according to frequencies in which the user visits local businesses and/or passes over national/global businesses in favor of local businesses. Then the local business metrics are presented on the user's client computing device along with a heat map indicating frequencies in which the user visited businesses within a geographic area, and/or a cool map indicating frequencies in which the user passed by businesses within the geographic area.

20 Claims, 12 Drawing Sheets

(56) References Cited

U.S. PATENT DOCUMENTS

| | | | |
|---|---|---|---|
| 2015/0348117 A1* | 12/2015 | Busch | G06Q 30/0267 |
| | | | 705/14.44 |
| 2016/0189186 A1* | 6/2016 | Fabrikant | G06Q 30/0205 |
| | | | 705/7.34 |
| 2016/0247175 A1* | 8/2016 | Milton | G06Q 30/0205 |
| 2018/0253784 A1* | 9/2018 | Tapley | G06Q 30/0639 |

OTHER PUBLICATIONS

Yang, "POI Information Enhancement Using Crowdsourcing Vehicle Trace Data and Social Media Data: A Case Study of Gas Station," 2018, ISPRS International Journal of Geo-Information, 7(5), p. 178 (Year: 2018).*

* cited by examiner

300

| User ID 302 | Name 304 | Location 306 | Date 308 | Time 310 | Duration 312 | Check in?/Review?/Social Media Post?/Financial Statement? 314 |
|---|---|---|---|---|---|---|
| 1 | John Doe | 66 E Lafayette Street, Bloomington, IL | 06/21/2019 | 12:00 pm | 1 hour | None |
| 2 | Jane Smith | Starbucks, 123 State Street, Bloomington, IL | 06/21/2019 | 1:02 pm | 5 min | None |
| 1 | John Doe | Route 66 and Main Street, Bloomington, IL | 06/21/2019 | 1:10 pm | 30 seconds | None |
| 1 | John Doe | Tony's Diner | 06/21/2019 | 1:30 pm | 10 min | Check in Financial Statement |

FIG. 3

| User ID 502 | Name 504 | POI 506 | Date 508 | Time 510 | Size 512 | Visited/ Passed Over? 514 | Business Type 516 |
|---|---|---|---|---|---|---|---|
| 1 | John Doe | Tony's Diner | 06/21/2019 | 1:30 pm | Local | Visited | Restaurant |
| 1 | John Doe | Subway | 06/21/2019 | 1:30 pm | National | Passed Over | Restaurant |
| 1 | John Doe | Dairy Queen | 06/21/2019 | 1:30 pm | National | Passed Over | Restaurant |
| 1 | John Doe | Main Street Convenience | 06/21/2019 | 1:30 pm | Local | Passed Over | Grocery |

| User ID 602 | Name 604 | Local Business Frequency 606 | National Business Frequency 608 | Local Business Passing Frequency 610 | National Business Passing Frequency 612 | Local Business Score 614 |
|---|---|---|---|---|---|---|
| 1 | John Doe | 3 per week | 6 per week | 10 per week | 20 per week | 250 |
| 2 | Jane Smith | 8 per week | 1 per week | 5 per week | 40 per week | 500 |
| 3 | Bob Johnson | 2 per week | 8 per week | 20 per week | 10 per week | 75 |
| 4 | Mary Jones | 7 per week | 14 per week | 20 per week | 40 per week | 280 |

METHOD AND SYSTEM FOR TRACKING LOCAL BUSINESSES VISITED BY A USER

TECHNICAL FIELD

The present disclosure generally relates to identifying points of interest (POIs) visited by a user as well as routes taken by the user to the POIs and, more particularly to determining a frequency in which a user visits local businesses over national/global businesses.

BACKGROUND

Today, many users request map and navigation data for various geographic locations. Software applications typically generate navigation data in response to receiving input from a user, and may recommend POIs to the user. However, POIs typically may be ranked according to popularity which may lead to a preference for national/global businesses over local businesses, due to their larger customer bases. Accordingly, local businesses may go unnoticed.

SUMMARY

To promote local businesses and generate awareness about the local businesses in a particular geographic area, a local business display system receives location data and movement data for a user over a time period. For example, the local business display system may receive the location data from a positioning sensor such as a global positioning sensor (GPS), and the movement data from an accelerometer, a gyroscope, a compass, etc. The local business display system may also obtain locations of POIs within the geographic area and identify POIs visited by the user based on the location data, and the amount of time the user is in or around a particular location. For example, if the location data indicates that the user is within a threshold distance of a POI (e.g., within 100 m) for more than a threshold amount of time (e.g., five minutes), the local business display system may determine that the user visited the POI. Additionally, in response to determining that the user visited a POI, the local business display system may identify the route the user took from a starting location to the POI. The starting location may be determined as the last location from which the user stayed within a threshold range (e.g., 100 m) for more than a threshold amount of time (e.g., five minutes). Then the local business display system may determine the route the user took based on the location data and movement data from the starting location to the POI.

Furthermore, for each POI, the local business display system may determine whether the POI is a local business or a national/global business, and may determine the type of business (e.g., restaurant, gas station, hotel, gym, concert hall, etc.) for the POI. Then the local business display system may determine the number of local businesses the user visited within a particular time period, the number of national/global businesses the user visited within the particular time period, the number of local businesses the user passed over and did not visit on her route to a national/global business, and the number of national/global businesses the user passed over and did not visit on her route to a local business. The local business display system may then generate a local business metric which may be a score based on how frequently the user visits local businesses and passes over national/global businesses in favor of the local businesses. The local business metric may also be based on how frequently the user visits local businesses relative to how frequently other users visit local businesses in the same geographic area. For example, users in a large city may visit local businesses less frequently than users in a small town. The local business display system may increase the score for each local business the user visits and for each national/global business the user passes over on her way to the local businesses. The local business display system may decrease the score for each national/global business the user visits and for each local business the user passes over on her way to the national/global businesses.

In some embodiments, the local business display system may provide rewards to the user based on her local business metric, such as discounts at the local businesses, or may present positive indicators on the user's client device, such as badges, high fives, etc. Additionally, the local business display system may generate a heat map that includes a digital map of the geographic area and depicts frequencies in which the user visited businesses within the geographic area. For example, the heat map may overlay colors over locations on the map, where warmer or darker colors indicate the locations that have been visited the most frequently. A heat map with warm colors overlaying the locations of several local businesses may indicate that the user is frequently visiting local businesses in the geographic area. Still further, the local business display system may generate a reverse heat map or cool map that includes the digital map of the geographic area and depicts frequencies in which the user passed over businesses on her way to other businesses. For example, the cool map may overlay colors over locations on the map, where colder or lighter colors indicate the locations have been passed over the most frequently. In this manner, the user may be provided with a graphic depiction of the businesses she frequents and the businesses she frequently passes over to see whether she has a preference for local businesses or national/global businesses. Accordingly, the local business display system encourages the user to visit the local businesses more frequently. The present embodiments advantageously provide a user interface that presents the user's location history in a manner that is easily understandable, and which highlights areas with local businesses that the user frequents and areas with local businesses that the user frequently passes over in favor of national/global businesses. The present embodiments improve the user experience by emphasizing local businesses which typically go unnoticed in alternative systems.

In an embodiment, a method for identifying local businesses visited by a user is provided. The method includes receiving location data and movement data for a user over a time period, and analyzing the location and movement data to identify one or more points of interest (POIs) visited by the user during the time period. For each of the one or more POIs, the method includes determining whether the POI is a local business having less than a threshold number of retail locations or having each retail location within the same local area. For each local business visited by the user, the method includes identifying national/global businesses which the user did not visit along a route to the local business. The method further includes generating a local business metric for the user according to the one or more POIs visited by the user during the time period including the local businesses visited by the user and the national/global businesses which the user did not visit along the routes to the local businesses, generating a heat map including a digital map of a geographic area for the user during the time period and depicting frequencies in which the user visited the local businesses within the geographic area, and providing the heat map for display on a client device of the user.

In another embodiment, a computing device for identifying local businesses visited by a user is provided. The computing device includes one or more processors and a non-transitory computer-readable memory coupled to the one or more processors and storing instructions thereon. When executed by the one or more processors, the instructions cause the computing device to receive location data and movement data for a user over a time period, and analyze the location and movement data to identify one or more points of interest (POIs) visited by the user during the time period. For each of the one or more POIs, the instructions cause the computing device to determine whether the POI is a local business having less than a threshold number of retail locations or having each retail location within the same local area. For each local business visited by the user, the instructions cause the computing device to identify national/global businesses which the user did not visit along a route to the local business. The instructions further cause the computing device to generate a local business metric for the user according to the one or more POIs visited by the user during the time period including the local businesses visited by the user and the national/global businesses which the user did not visit along the routes to the local businesses, generate a heat map including a digital map of a geographic area for the user during the time period and depicting frequencies in which the user visited the local businesses within the geographic area, and provide the heat map for display on a client device of the user.

In yet another embodiments, non-transitory computer-readable memory coupled to one or more processors and storing instructions thereon is provided. When executed by the one or more processors, the instructions cause the one or more processors to receive location data and movement data for a user over a time period, and analyze the location and movement data to identify one or more points of interest (POIs) visited by the user during the time period. For each of the one or more POIs, the instructions cause the one or more processors to determine whether the POI is a local business having less than a threshold number of retail locations or having each retail location within the same local area. For each local business visited by the user, the instructions cause the one or more processors to identify national/global businesses which the user did not visit along a route to the local business. The instructions further cause the one or more processors to generate a local business metric for the user according to the one or more POIs visited by the user during the time period including the local businesses visited by the user and the national/global businesses which the user did not visit along the routes to the local businesses, generate a heat map including a digital map of a geographic area for the user during the time period and depicting frequencies in which the user visited the local businesses within the geographic area, and provide the heat map for display on a client device of the user.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 3 illustrates an example data table including location data for users at various points in time;

FIG. 5 illustrates another example data table including the points of interest (POIs) visited by or passed over by users at various points in time;

FIG. 6 illustrates yet another example data table including local business metrics for users;

DETAILED DESCRIPTION

Figure 1:
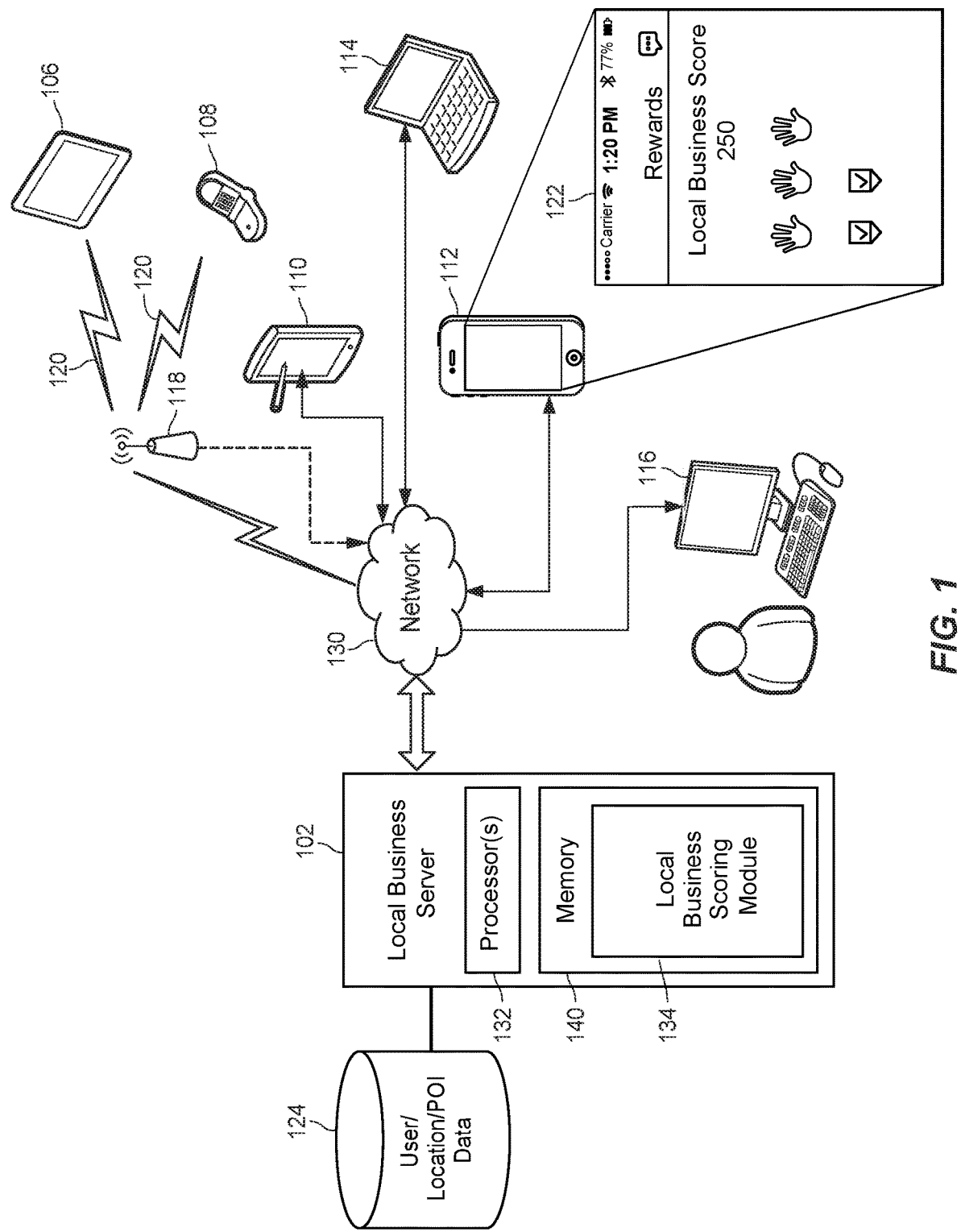
FIG. 1 illustrates a block diagram of a computer network and system on which an example local business display system may operate in accordance with the presently described embodiments.

Although the following text sets forth a detailed description of numerous different embodiments, it should be understood that the legal scope of the description is defined by the words of the claims set forth at the end of this patent and equivalents. The detailed description is to be construed as example only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Accordingly, as used herein, the term "local business" may be used to refer to a business having less than a threshold number of retail locations, or where each of the retail locations is within a threshold geographic range (e.g., the same city, the same state, within a 100 mile radius, etc.). The term "national/global business," as used herein, may refer to any business which is not a local business.

Generally speaking, techniques for identifying local businesses visited by a user may be implemented in one or several client devices, one or several network servers or a system that includes a combination of these devices. However, for clarity, the examples below focus primarily on an embodiment in which a client device generates location data and movement data for a user via sensors at the client device, such as an accelerometer, global positioning system (GPS) module, inertial measurement unit (IMU), gyroscope, compass, etc. The client device then provides the location data and movement data to a local business server that analyzes the location data and movement data for the user over a time period (e.g., the previous week, month, year, etc.). The local business server analyzes the location data and movement data to identify POIs or business locations the user visited, routes the user traveled along from starting locations to POIs, and POIs or business locations that the user passed over and did not visit while travelling along the routes to other POIs. For each POI, the local business server may determine whether the POI is a local business or a national/global business. Then the local business server generates a local business metric based on the frequency in which the user visited local businesses, the frequency in which the user visited national/global businesses, the frequency in which the user passed over and did not visit local businesses along routes to national/global businesses, and/or the frequency in which the user passed over and did not visit national/global businesses along routes to local businesses.

In addition to the local business metric, the local business server may generate a heat map that includes a digital map of the geographic area and depicts frequencies in which the user visited businesses within the geographic area. For example, the heat map may overlay colors over locations on the map, where warmer or darker colors indicate the locations that have been visited the most frequently. A heat map with warm colors overlaying the locations of several local businesses may indicate that the user is frequently visiting local businesses in the geographic area. Still further, the local business display system may generate a reverse heat map or cool map that includes the digital map of the geographic area and depicts frequencies in which the user passed over businesses on her way to other businesses. For example, the cool map may overlay colors over locations on the map, where colder or lighter colors indicate the locations have been passed over the most frequently. The local business server may provide the local business metric, the heat map, and/or the cool map to the client device for display on the client device. The local business server may also provide rewards to the user based on the local business metric, such as discounts at the local businesses, or positive indicators for display on the user's client device, such as badges, high fives, etc.

Referring to FIG. 1, an example local business display system 100 includes a local business server 102 and a plurality of client computing devices 106-116 which may be communicatively connected through a network 130, as described below. According to embodiments, the local business server 102 may be a combination of hardware and software components, also as described in more detail below. The local business server 102 may have an associated database 124 for storing data related to the operation of the local business display system 100 (e.g., user profile data for users, location and movement data for the users, POI data indicating for each POI the name, location, type of business, whether the business is a local or national/global business, etc.). Moreover, the local business server 102 may include one or more processor(s) 132 such as a microprocessor coupled to a memory 140.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a local business scoring module 134. The local business server 102 is described in more detail below with reference to FIG. 2A.

The local business scoring module 134 may obtain location data and movement data for a user from a client computing device 106-116. For example, the client computing device 106-116 may periodically (e.g., every second, every 30 seconds, every minute, etc.) provide updated location data and movement data to the local business scoring module 134. The local business scoring module 134 may analyze the location data and movement data for the user over a particular time interval (e.g., a day, a week, etc.) to identify POIs visited by the user during the time interval, routes in which the user travelled to the POIs, and other POIs the user passed over and did not visit on the routes to the POIs. The local business scoring module 134 may generate a local business metric based on this data, and may also generate a heat map and a cool map indicating frequencies in which the user visited POIs and frequencies in which the user passed over POIs on her way to visit other POIs, respectively. Then the local business scoring module 134 may transmit the local business metric, indications of rewards received according to the local business metric, the heat map, and/or the cool map to the client computing device 106-116 for display on a user interface.

The client computing devices 106-116 may include, by way of example, various types of "mobile devices," such as a tablet computer 106, a cell phone 108, a personal digital assistant (PDA) 110, a smart phone 112, a laptop computer 114, a desktop computer 116, a portable media player (not shown), a home phone, a pager, a wearable computing device, smart glasses, smart watches or bracelets, phablets, other smart devices, devices configured for wired or wireless RF (Radio Frequency) communication, etc. Of course, any client computing device appropriately configured may interact with the local business display system 100. The client computing devices 106-116 need not necessarily communicate with the network 130 via a wired connection. In some instances, the client computing devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

Each of the client computing devices 106-116 may interact with the local business server 102 to receive web pages and/or server data and may display the web pages and/or server data via a client application and/or an Internet browser (described below). For example, the smart phone 112 may display a local business metric screen 122, may capture location data and movement data for the user, and may interact with the local business server 102.

The local business server 102 may communicate with the client computing devices 106-116 via the network 130. The digital network 130 may be a proprietary network, a secure public Internet, a local area network (LAN), a wide area network (WAN), a virtual private network (VPN) or some other type of network, such as dedicated access lines, plain ordinary telephone lines, satellite links, combinations of these, etc. Where the digital network 130 comprises the Internet, data communication may take place over the digital network 130 via an Internet communication protocol.

Figure 2A:
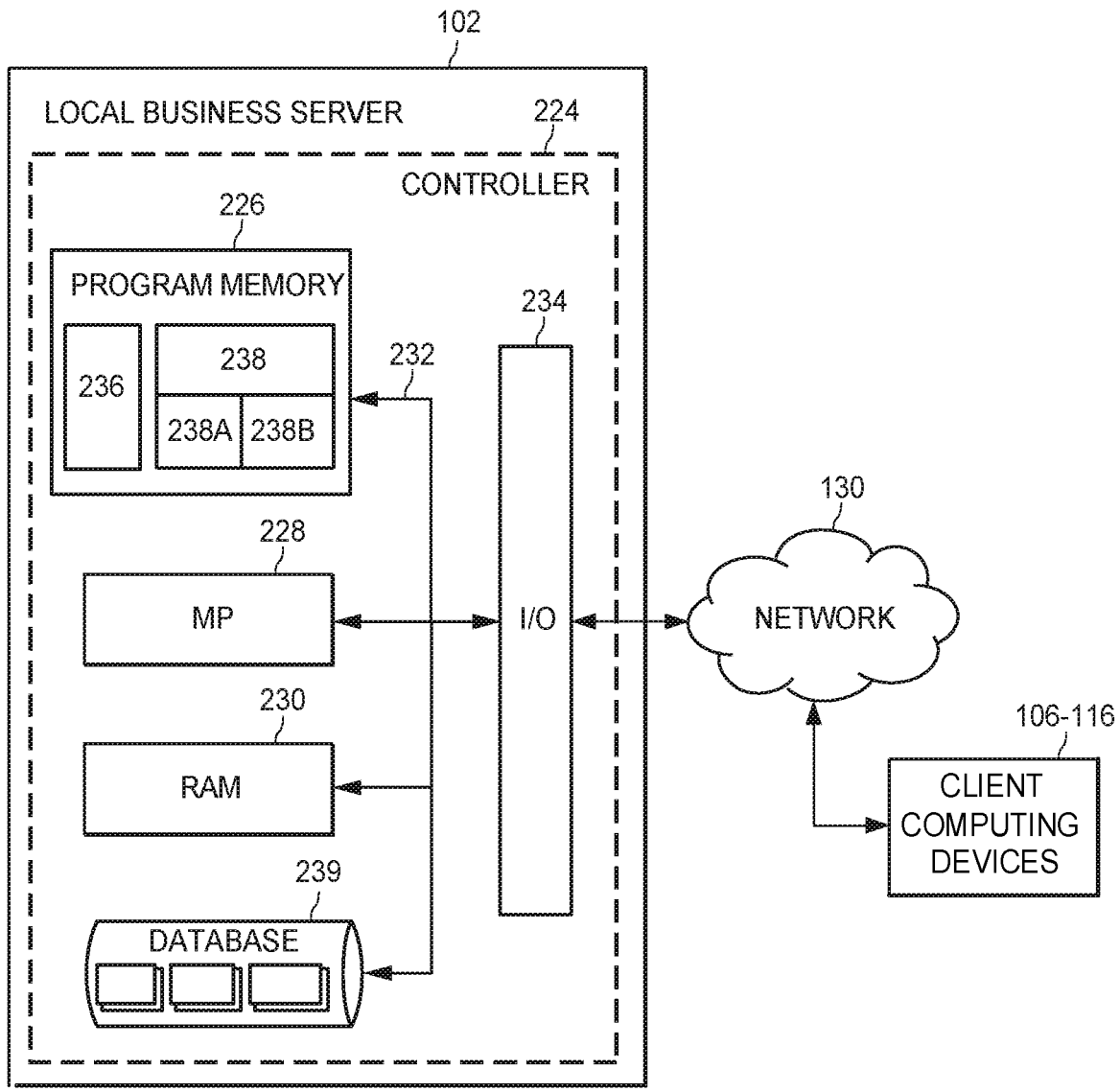
FIG. 2A illustrates a block diagram of an example server device that can operate in the system of FIG. 1.

Turning now to FIG. 2A, the local business server 102 may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as user profile data, web page templates and/or web pages, and other data necessary to interact with users through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the local business server 102, which user interface may, for example, allow a system administrator to configure, troubleshoot, or test various aspects of the server's operation. A server application 238 may operate to receive location and movement data a user, generate a local business metric for the user, and transmit an indication of the local business metric as well as a heat map and/or a cool map to a user's client computing device 106-116. The server application 238 may be a single module 238 such as the local business scoring module 134 or a plurality of modules 238A, 238B.

While the server application 238 is depicted in FIG. 2A as including two modules, 238A and 238B, the server application 238 may include any number of modules accomplishing tasks related to implementation of the local business server 102. Moreover, it will be appreciated that although only one local business server 102 is depicted in FIG. 2A, multiple local business servers 102 may be provided for the purpose of distributing server load, serving different web pages, etc. These multiple local business servers 102 may include a web server, an entity-specific server (e.g. an Apple® server, etc.), a server that is disposed in a retail or proprietary network, etc.

Figure 2B:
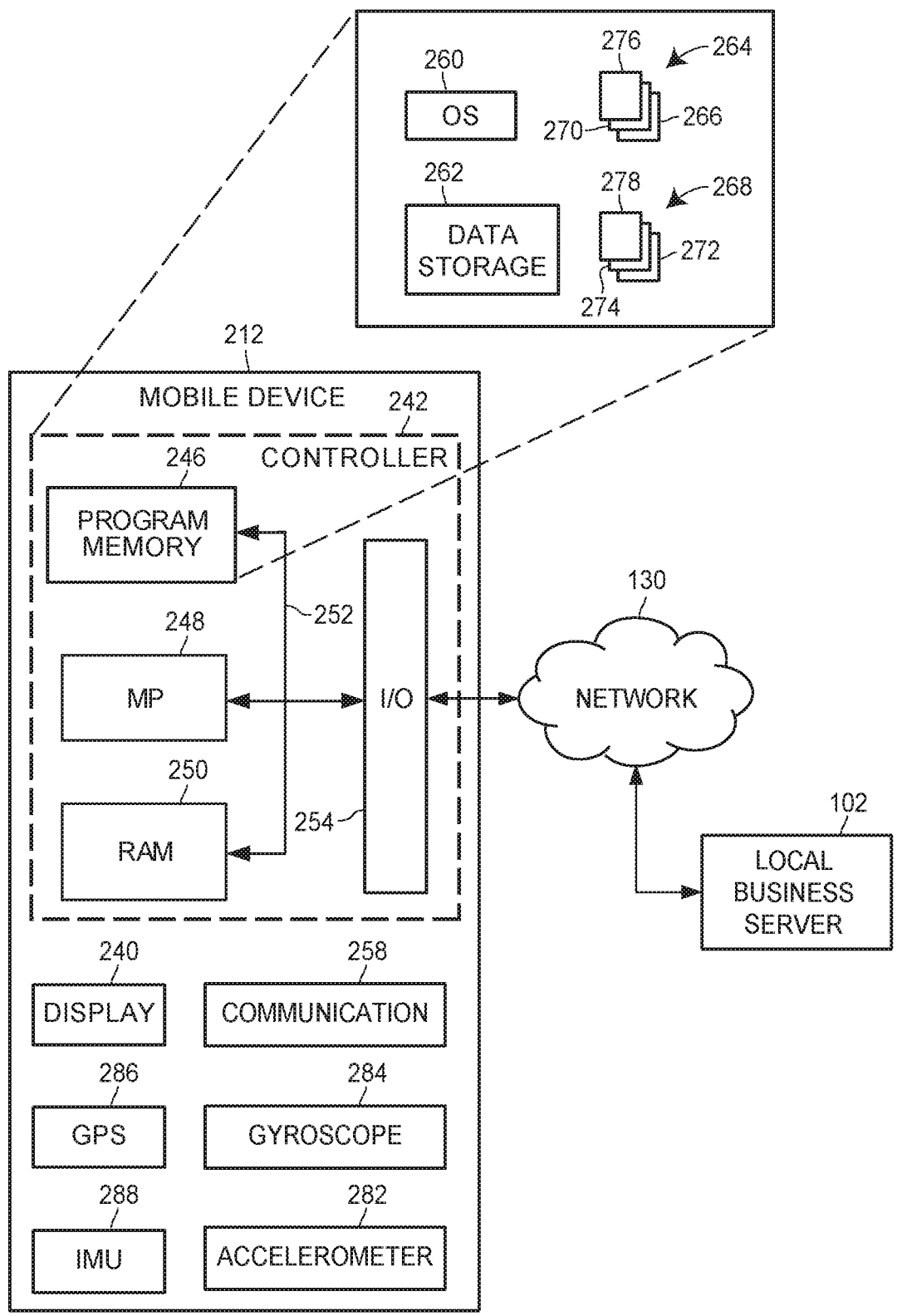
FIG. 2B illustrates an example client device that can operate in the system of FIG. 1.

Referring now to FIG. 2B, the smart phone 112 (or any of the client computing devices 106-116) may include a display 240, a communication unit 258, accelerometers 282, an inertial measurement unit (IMU) 284, a positioning sensor such as a Global Positioning System (GPS) 286, a gyroscope 288, a compass (not shown) a user-input device (not shown), and, like the local business server 102, a controller 242.

Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

The data storage 262 may include data such as user profiles, application data for the plurality of applications 264, routine data for the plurality of routines 268, and/or other data necessary to interact with the local business server 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the client computing device 112.

The communication unit 258 may communicate with the local business server 102 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the client computing device 112, an external hardware keyboard communicating via a wired or a wireless connection (e.g., a Bluetooth keyboard), an external mouse, or any other suitable user-input device.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the client computing device 112.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the server 102 while also receiving inputs from the user. Another application of the plurality of applications may include an embedded web browser 276 that may be implemented as a series of machine-readable instructions for receiving, interpreting, and/or displaying web page information from the local business server 102. One of the plurality of routines may include a location detection routine 272 which captures location and movement data for the user (e.g., from the GPS, the accelerometer, the compass, the gyroscope, and/or the IMU) and periodically provides the location and movement data to the local business server 102. Another routine in the plurality of routines may include a local business metric display routine 274 which presents an indication of the user's local business metric, a heat map, and/or a cool map on the display 240.

As described above, to generate a local business metric for a user, the local business server 102 may receive location data and movement data from the user's client computing device 106-116 and may store the location history for the user. FIG. 3 illustrates an example data table 300 including location data for users, which may be stored in the database 124. The data table 300 may include a user identifier (ID) 302 which uniquely identifies the user, the name 304 of the user, the user's location 306, the date 308 and time 310 when the user visited the location, the duration 312 in which the user visited the location, and an indication of whether the user provided additional information indicating the user visited the location 314, such as a check-in at the location, a review of the location, a social media post related to the location, a financial statement indicating the user made a purchase at the location, etc.

While these are a few examples of location data which may be included in the data table 300, the data table 300 may include additional or alternative characteristics, such as movement data indicating the speed and direction in which the user is moving. The user's location 306 may include GPS coordinates, such as latitude and longitude coordinates, or may include a street address or POI corresponding to the GPS coordinates. For example, the local business server 102 may obtain map data from a map database and compare the GPS coordinates to the GPS coordinates of street addresses and POIs in the map database. In another example, the local business server 102 may invoke a mapping application programming interface (API) to retrieve a street address or POI corresponding to a set of GPS coordinates. The local business server 102 may also identify a date and time 310 when the user visited the location based on the date and time when the GPS coordinates were received.

In some embodiments, the client computing device 106-116 may provide location data and movement data including GPS coordinates to the local business server 102 periodically (e.g., every second, every ten seconds, every 30 seconds, every minute, etc.). The local business server 102 may determine the duration 312 in which the user visited the location based on the amount of time in which the user was at the same location or within a threshold distance of the same location. For example, the data table 300 indicates that John Doe was at 66 E Lafayette Street, Bloomington, Ill. for one hour. During that time frame, the local business server 102 may receive location data from John Doe's client computing device indicating that John was anywhere between 40 E Lafayette Street and 70 E Lafayette Street. Accordingly, the local business server 102 may determine that John was at 66 E Lafayette Street during the entire time frame.

In addition to receiving location and movement data from the user's client computing device 106-116, the local business server 102 may also obtain additional information to corroborate that the user went to a particular location. This additional information may include an online check-in at the particular location, a review of the particular location, a social media post involving the particular location, a financial statement indicating a purchase at the particular location, etc. To obtain this information, the user may share social media data and/or financial data with the local business server 102, and the local business server 102 may subscribe to a feed for the user, such as a Rich Site Summary (RSS) feed or invoke an API. For example, if the user shares social media data, online check-ins, and/or reviews, the local business server 102 may obtain Facebook® posts and check-ins, Instagram® posts, Twitter® tweets, Yelp® reviews, etc., made by the user. If the user shares financial data, the local business server 102 may obtain portions of credit card statements or bank statements indicating the locations, dates, and/or times of purchases made by the user. In other implementations, the user may send pictures of receipts or other financial statements to the local business server 102 via the client application 266. The local business server 102 may then analyze the user's online check-ins, reviews, social media posts, and/or financial statements and their corresponding dates and times to verify that the user visited the location detected by the client computing device 106-116 sensors. If the user visited a different location than the location determined from the sensor data, the local business server 102 may remove the detected location from the database 124.

In any event, the local business server 102 may analyze the location data from the data table 300 to identify POIs the user visited, routes the user travelled along to reach the POIs, and POIs the user passed over and did not visit on her way to the visited POI. The local business server 102 may determine that the user visited a POI when the user is at the POI for more than a threshold duration (e.g., two minutes, five minutes, 10 minutes, etc.). Additionally, the local business server 102 may identify a route the user travelled along to reach a POI (the destination location) by determining that a starting location is the previous location in which the user stayed for more than a threshold duration. The local business server 102 may then construct the route by using locations in between the starting location and the destination location which the user passed for less than a threshold duration as waypoints along the route.

The local business server 102 may also obtain navigation data from a navigation database or may invoke a navigation API to retrieve the navigation data. For example, according to the data table 300 John Doe was at Tony's Diner for 10 minutes at 1:30 p.m. on Jun. 21, 2019. On the same day, John Doe was at 66 E Lafayette Street, Bloomington, Ill. for one hour from 12:00 p.m. until 1:00 p.m. prior to arriving at Tony's Diner. Accordingly, the local business server 102 may determine that 66 E Lafayette Street, Bloomington, Ill. was the starting location for traveling to Tony's Diner. At 1:10 p.m., John Doe was at Route 66 and Main Street, Bloomington, Ill. for 30 seconds. John may have stopped at that location for 30 seconds, such as due to a traffic light or the local business server 102 may periodically receive location data every 30 seconds indicating that John Doe was at this location for no more than 30 seconds. In any event, the local business server 102 may construct a route from 66 E Lafayette Street, Bloomington, Ill. to Tony's Diner with Route 66 and Main Street, Bloomington, Ill. being a waypoint on the route. In some embodiments, the local business server 102 may invoke the navigation API and provide the starting location, the destination location, and the waypoints as parameters. The local business server 102 may then receive a route from a navigation server via the navigation API that includes the starting location, the destination location, and the waypoints.

Figure 4:
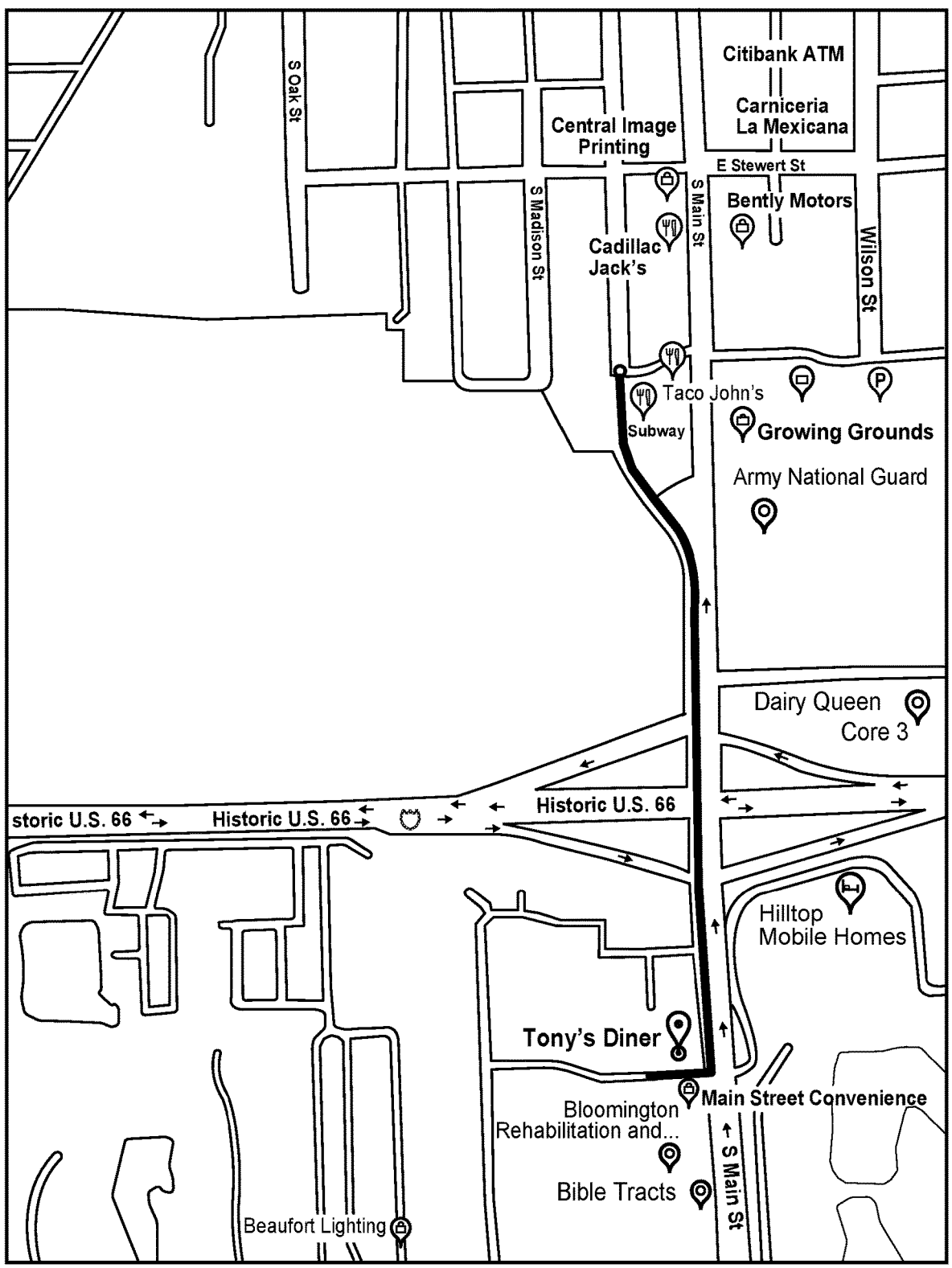
FIG. 4 illustrates an example map representation of a route traveled by a user from a starting location to a destination location based on the location data from the data table of FIG. 3.

An example of this route is illustrated in the map representation 400 shown in FIG. 4. The local business server 102 may identify POIs the user passed over and did not visit on his way to Tony's Diner according to the POIs within a threshold distance of the route (e.g., within one mile, two miles, five miles, ten miles, etc.) and the amount of time in which the user was within the threshold distance of each POI. If the user was within the threshold distance of the POI for less than a threshold amount of time (e.g., five minutes), the local business server 102 may determine that the user did not visit the POI. In some embodiments, the local business server 102 may determine the type of business for the destination POI and may identify POIs the user passed over which are the same type of business as the destination POI. For example, Tony's Diner may be a restaurant, and the local business server 102 may identify other restaurants the user passed over on his way to Tony's Diner.

The local business server 102 may store indications of the POIs visited by the user and the POIs the user passed over and did not visit on the way to the visited POIs, for example in the database 124. This information may be associated with the user's profile for retrieving indications of the POIs visited by the user and the POIs the user passed over via a user profile for the user. FIG. 5 illustrates an example data table 500 including indications of the POIs visited by or passed over by users at various points in time. The data table 500 may include a user ID 502 for the user, the name of the user 504, the name and/or location of the POI 506, the date 508 and time 510 in which the user visited or passed over the POI, the size of the POI 512 (local, national/global, etc.), whether the user visited or passed over the POI 514, and the type of business 516 for the POI.

The local business server 102 may determine the size of the POI based on the number of retail locations for the business corresponding to the POI and/or the geographic range of the retail locations. If the business corresponding to the POI (e.g., Dairy Queen®) has less than a threshold number of retail locations (e.g., three, five, seven, etc.), or each of the locations for the business corresponding to the POI are within a threshold geographic range (e.g., the same city, the same state, within a 100 mile radius, etc.) the local business server 102 may determine that the POI is a local business. Otherwise, the local business server 102 may determine that the POI is a national/global business. In some embodiments, the local business server 102 determines whether a POI is a local business based on any suitable combination of the number of retail locations and/or the geographic range of the retail locations.

The local business server 102 may also determine the size of the POI based on any suitable combination of the number of employees for the business corresponding to the POI, an amount of revenue for the business corresponding to the POI, content included in reviews of the POI, etc. This information may act as a proxy for determining the number of retail locations and/or geographic range of the POI. For example, the local business server 102 may use the number of employees, amount of revenue, content included in reviews of the POI, etc., to verify that the POI corresponds to a local business and has less than a threshold number of locations or the locations are within a threshold geographic range. The local business server 102 may obtain an indication of the number of retail locations for the business corresponding to the POI and/or the geographic range of the retail locations from the map database or by invoking the mapping API to retrieve indications of each retail location for the business corresponding to the POI. The local business server 102 may obtain reviews of the POI from online sources, such as Yelp®, OpenTable®, etc., and may analyze the reviews to identify terms such as "local" or "neighborhood." The local business server 102 may obtain business data such as the number of employees for the business corresponding to the POI, the amount of revenue for the business corresponding to the POI, etc. from various online sources. Additionally, the local business server 102 may determine the type of business for the POI from the map database, by invoking the mapping API, or from various online sources. In some embodiments, the local business server 102 may store indications of sizes of POIs and the type of businesses for the POIs in a separate business database, and may obtain the size of a POI and/or the type of business for a POI from the business database.

For example, as shown in the data table 500, John Doe visited Tony's Diner at 1:30 p.m. on Jun. 21, 2019, which is a local restaurant. On the way to Tony's Diner, John Doe passed over and did not visit Subway® and Dairy Queen® which are both national restaurants. John Doe also passed over and did not visit Main Street Convenience Store which is a local grocery store. The local business server 102 may analyze the indications of the POIs visited by or passed over by a user at various points in time to determine a frequency in which the user visits local businesses, a frequency in which the user visits national businesses, a frequency in which the user passes over local businesses in favor of national/global businesses, and a frequency in which the user passes over national/global businesses in favor of local businesses. FIG. 6 illustrates another example data table 600 including local business metrics for users. The data table 600 may include a user ID 602 for the user, the name of the user 604, a local business frequency 606, a national business frequency 608, a local business passing frequency 610, a national business passing frequency 612, and a local business score 614. The local business frequency may be based on the number of times a user visits local businesses within a particular time interval (e.g., within a day, a week, a month, a year, etc.), or may be the average number of times a user visits local businesses within the particular time interval (e.g., the user averages 3.4 visits per week to local businesses). The national business frequency may be based on the number of times a user visits national businesses within a particular time interval (e.g., within a day, a week, a month, a year, etc.), or may be the average number of times a user visits national businesses within the particular time interval (e.g., the user averages 5.6 visits per week to national businesses).

The local business passing frequency may be based on the number of times a user passes over and does not visit a local business within a particular time interval (e.g., within a day, a week, a month, a year, etc.), or may be the average number of times a user passes over and does not a local business within the particular time interval (e.g., the user passes over an average of 7.2 local businesses per week). In some embodiments, the number of times a user passes over and does not visit a local business within a particular time interval may only include local businesses passed over for a national business. If the user visits another local business then the local business is not included in the count of local businesses being passed over within the particular time interval. Also in some embodiments, the number of times a user passes over and does not visit a local business within a particular time interval may only include local businesses which were passed over and are the same type of business as the visited business. For example, referring back to FIG. 5, the data table 500 indicates that John Doe passed over and did not visit Main Street Convenience, a grocery store, in favor of Tony's Diner, a restaurant. This may not be included in the number of times a user passes over and does not visit a local business since the visited business (Tony's Diner) is a different type of business than the business that was passed over (Main Street Convenience).

The national business passing frequency may be based on the number of times a user passes over and does not visit a national business within a particular time interval (e.g., within a day, a week, a month, a year, etc.), or may be the average number of times a user passes over and does not a national business within the particular time interval (e.g., the user passes over an average of 12.3 national businesses per week). In some embodiments, the number of times a user passes over and does not visit a national business within a particular time interval may only include national businesses passed over for a local business. If the user visits another national business then the national business is not included in the count of national businesses being passed over within the particular time interval. Also in some embodiments, the number of times a user passes over and does not visit a national business within a particular time interval may only include national businesses which were passed over and are the same type of business as the visited business.

In any event, the local business server 102 may generate a local business score for the user based on any suitable combination of the local business frequency, the national business frequency, the local business passing frequency, and/or the national business passing frequency. In some embodiments, the local business server 102 may increase the local business score according to the local business frequency and the national business passing frequency, and may decrease the score according to the national business frequency and the local business passing frequency. The local business score may also be a weighted combination of the local business frequency, the national business frequency, the local business passing frequency, and/or the national business passing frequency. The local business server 102 may also adjust the local business score based on the amount in which a user changes her habits from one time interval to the next. For example, a user who significantly increases her local business frequency and national business passing frequency from one week or month to the next may receive a higher increase in her local business score than a user who starts off with a high local business frequency and national business passing frequency but maintains similar frequencies in the subsequent time interval.

Still further, the local business server 102 may adjust the local business score according to the geographic area for the user. For example, some users may be located in densely populated areas with more opportunities to visit national businesses, such as cities. Other users may be located in sparsely populated areas with less opportunities to visit national businesses and a higher concentration of local businesses, such as small towns. Accordingly, the local business server 102 may adjust the local business score to account for the number of local businesses and national businesses in the user's geographic area or the ratio of local business to national businesses in the user's geographic area. For example, the local business server 102 may generate the local business score based on the difference between the local business frequency for the user and local business frequencies for other users in the same geographic area. As shown in FIG. 6, Mary Jones visits over twice as many local businesses per week as John Doe and passes over twice as many national businesses as John Doe. However, she also visits more than twice as many national businesses as John Doe and passes over twice as many local businesses as John Doe. Accordingly, her local business score is similar to John Doe's.

Moreover, the local business server 102 may adjust the local business score according to other user characteristics included in the user's profile. For example, the local business server 102 may adjust the local business score according to demographic data such as the age group in which the user belongs. The local business server 102 may analyze the local business metrics including the local business frequency, the national business frequency, the local business passing frequency, and the national business passing frequency for users in different age groups (e.g., ages 21-30, 31-40, 41-50, etc.), and may adjust the local business score for the user according to the user's age group.

The local business server 102 may then provide rewards to the user based on the local business score, based on the change in the local business score from one time interval to another, or based on any of the other local business metrics (e.g., the local business frequency, the national business frequency, the local business passing frequency, the national business passing frequency, etc.). The rewards may be positive or encouraging indicators which may be presented on the user's client device, such as badges, high fives, etc. The rewards may also be discounts at the local businesses, such as 50% off any purchase, a free drink, etc. In some embodiments, the user may earn positive or encouraging indicators for reaching threshold local business scores which may be exchanged for discounts at the local businesses. For example, a user may exchange 200 points from her local business score for a badge, and may exchange 1000 points from her local business score for a high five. The user may then exchanges badges and high fives for various discounts at the local businesses. This is described in more detail below with reference to FIG. 7.

Figure 7:
FIG. 7 illustrates an example local business metric display which may be presented on the client device.
Figure 8:
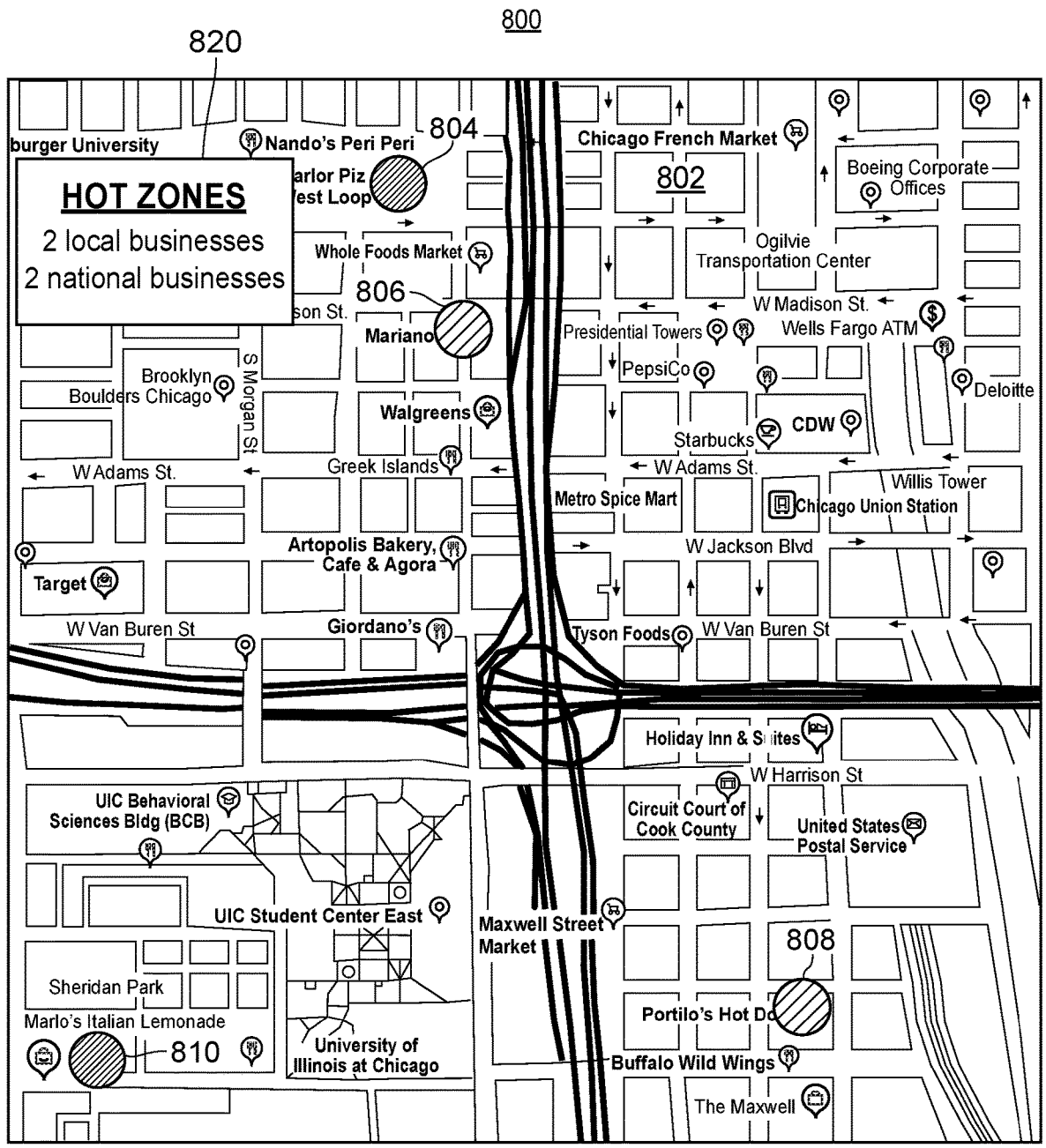
FIG. 8 illustrates an example display of a heat map depicting frequencies in which the user visited POIs in a geographic area which may be presented on the client device.
Figure 9:
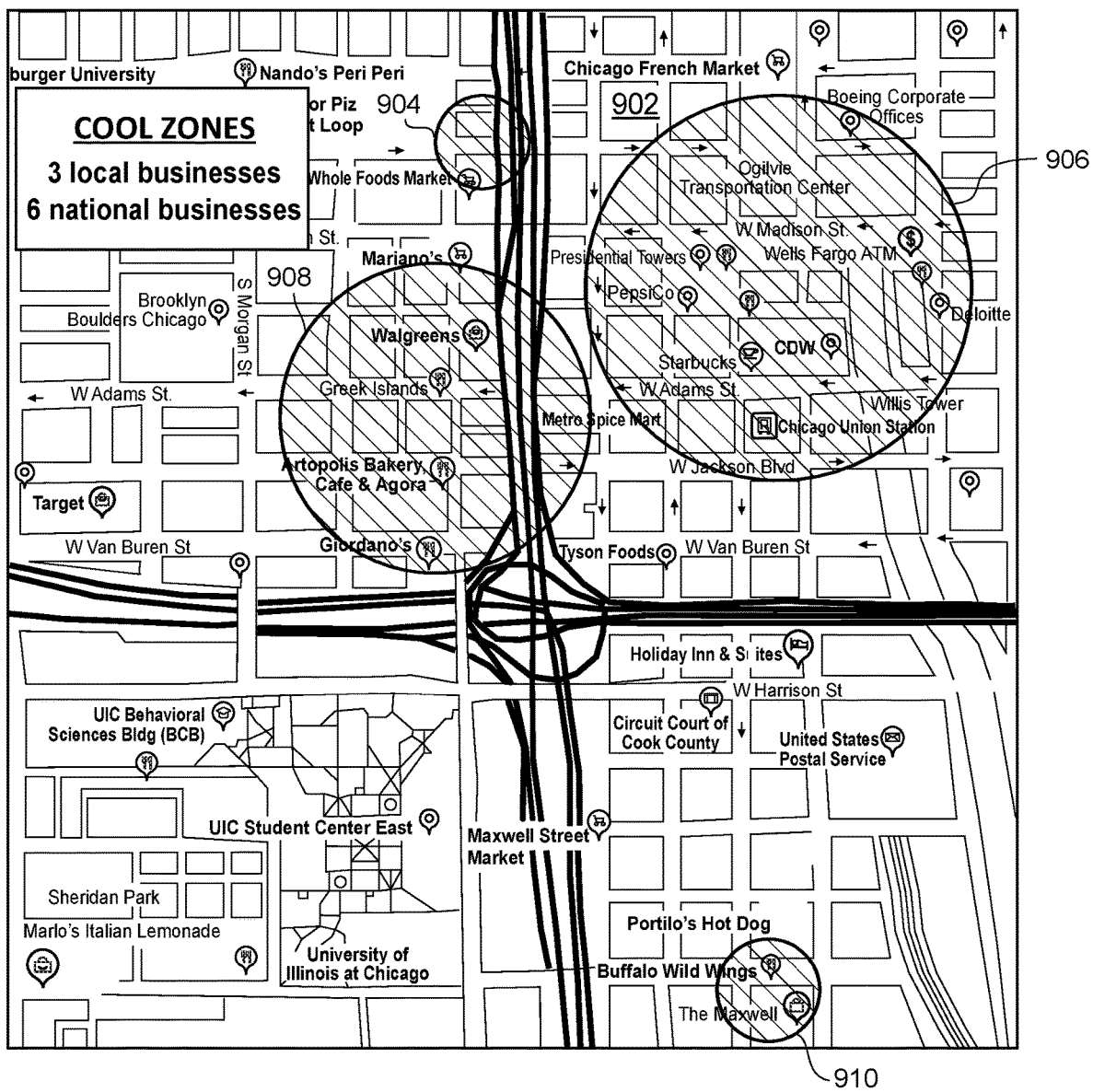
FIG. 9 illustrates an example display of a reverse heat map or cool map depicting frequencies in which the user did not visit POIs along routes to other POIs in the geographic area which may be presented on the client device.

Turning back to FIG. 2B, a user may launch the client application 266 from the client computing device 112, to communicate with the local business server 102 to implement the local business display system. Additionally, the user may also launch or instantiate any other suitable user interface application (e.g., the native application or web browser 270, or any other one of the plurality of software applications 264) to access the local business server 102 to realize the local business display system. FIGS. 7-9 illustrate example displays which may be presented on the user interface of the client computing device 106-116.

More specifically, FIG. 7 illustrates an example local business metric display 700 which may be presented on the client computing device 106-116. As described above, the local business server 102 may generate f local business metrics including a local business frequency, a national business frequency, a local business passing frequency, a national business passing frequency, and a local business score for a user based on the user's location data and/or movement data over a time period. The local business server 102 may also provide rewards to the user based on the local business score, the change in the local business score from one time interval to another, or based on any of the other local business metrics. The local business metrics and/or the rewards may be presented on the local business metric display 700.

As shown in FIG. 7, the local business metric display includes the local business frequency (three times per week), the national business frequency (6 times per week), the local business passing frequency (10 times per week), the national business passing frequency (20 times per week), and the local business score (250) for the user. The local business metrics may be averages over several time periods, such as several weeks, or may be local business metrics from the most recent time interval (e.g., the previous week). The local business metric display 700 may also include indications of rewards such as high fives 702 and badges 704. In the example display 700, the user has three high fives and two badges. High fives and badges may be earned by exchanging points from the local business score. For example, the user may exchange 200 points from her local business score for a badge, and accordingly the local business score may be reduced by 200 points. The local business metric display 700 also indicates that two high fives may be exchanged for a 50% discount at a local business, and one badge may be exchanged for a free drink at a local business.

In addition to presenting local business metrics and indications of rewards on the user interface of the client computing device 106-116, the local business server 102 may generate a heat map and/or a reverse heat map or cool map indicating frequencies in which the user visited POIs and frequencies in which the user passed over POIs on her way to visit other POIs, respectively. The local business server 102 may provide the heat map and/or cool map for display on the client computing device 106-116. In this manner, the user is presented with a visual representation of the business locations that the user frequents and the business locations that the user frequently passes over in favor of other business locations. The heat map may also include numeric indicators which display the number of "hot zones" or businesses the user frequents corresponding to local businesses, and the number of "hot zones" or businesses the user frequents corresponding to national/global businesses. Similarly, the cool map may include numeric indicators which display the number of "cold zones" or businesses the user frequently passes over corresponding to local businesses, and the number of "cold zones" or businesses the user frequently passes over corresponding to national/global businesses. In some embodiments, the heat map and/or cool map are generated based on local business metrics for the user from the most recent time period or over several time periods. In other embodiments, the heat map and/or cool map are generated based on changes in local businesses from one time interval to the next.

FIG. 8 illustrates an example heat map 800 which may be presented on the client computing device 106-116. The heat map 800 may include a digital map 802 of a geographic area where the user traveled during a time period or during several time periods. The digital map 802 may be highlighted in various regions 804-810 such as with warm colors (e.g., red, yellow, and orange), indicating that the user frequently traveled to those regions during the time period or during several time periods. The local business server 102 may identify "hot zones" or regions of the digital map to highlight with warm colors based on the frequency in which the user visited the region. More specifically, the local business server 102 may compare frequencies to threshold frequencies to determine whether to highlight regions, and/or to determine with which colors to highlight the regions. For example, when the local business frequency or the national business frequency for a region is above a first threshold frequency, the local business server 102 may determine to highlight the region with a yellow color or a first shading. When the local business frequency or the national business frequency for a region is below the first threshold frequency, the local business server 102 may determine not to highlight the region at all. Additionally, when the local business frequency or the national business frequency for a region is above a second threshold frequency, which is greater than the first threshold frequency, the local business server 102 may determine to highlight the region with an orange color or a second shading. When the local business frequency or the national business frequency for a region is above a third threshold frequency, which is greater than the second threshold frequency, the local business server 102 may determine to highlight the region with a red color or a third shading.

In the example heat map 800, the regions around Parlor Pizza 804 and Mario's Italian Lemonade 810 are highlighted with a red color or a third shading. The region around Mariano's 806 is highlighted with an orange color a second shading, and the region around Portillo's Hot Dogs 808 is highlighted with a yellow color or a first shading. The example heat map 800 may also include a numeric indicator 820 of the number of local businesses in the "hot zones" and the number of national businesses in the "hot zones." In this example, the local business server 102 identifies Mariano's® and Portillo's Hot Dogs® as national businesses due to their large number of locations and locations throughout the United States. The local business server 102 identifies Mario's Italian Lemonade as a local business, because it only has one location. Moreover, while Parlor Pizza® has multiple locations, each of the locations are within the city of Chicago. Accordingly, the local business server 102 also identifies Parlor Pizza® as a local business.

FIG. 9 illustrates an example cool map 900 which may be presented on the client computing device 106-116. The cool map 900 may include a digital map 902 of a geographic area where the user traveled during a time period or during several time periods. The digital map 902 may be highlighted in various regions 904-910 such as with cold colors (e.g., green, blue, and violet), indicating that the user frequently passed over and did not visit those regions on the way to other business locations during the time period or during several time periods. The local business server 102 may identify "cold zones" or regions of the digital map to highlight with cool colors based on the frequency in which the user passed over and did not visit the region. More specifically, the local business server 102 may compare frequencies to threshold frequencies to determine whether to highlight regions, and/or to determine with which colors to highlight the regions. For example, when the local business passing frequency or the national business passing frequency for a region is above a fourth threshold frequency, the local business server 102 may determine to highlight the region with a green color or a fourth shading. When the local business passing frequency or the national business passing frequency for a region is below the fourth threshold frequency, the local business server 102 may determine not to highlight the region at all. Additionally, when the local business passing frequency or the national business passing frequency for a region is above a fifth threshold frequency, which is greater than the fourth threshold frequency, the local business server 102 may determine to highlight the region with a blue color or a fifth shading. When the local business passing frequency or the national business passing frequency for a region is above a sixth threshold frequency, which is greater than the fifth threshold frequency, the local business server 102 may determine to highlight the region with a violet color or a sixth shading.

The example cool map 900 may also include a numeric indicator 920 of the number of local businesses in the "cool zones" and the number of national businesses in the "cool zones." In this example, the local business server 102 identifies Whole Foods Market®, Giordano's®, Buffalo Wild Wings®, Starbucks®, Chipotle®, and Blaze Pizza® as national businesses due to their large number of locations and locations throughout the United States. The local business server 102 identifies Greek Islands, Artopolis Bakery, Café & Agora, and South Branch Tavern and Grill as local businesses, because they only have one location. The cool map 900 may indicate for example, that the user frequently passes by Whole Foods Market® in favor of a local grocery store or passes by Starbucks® in favor of a local coffee shop.

Figure 10:
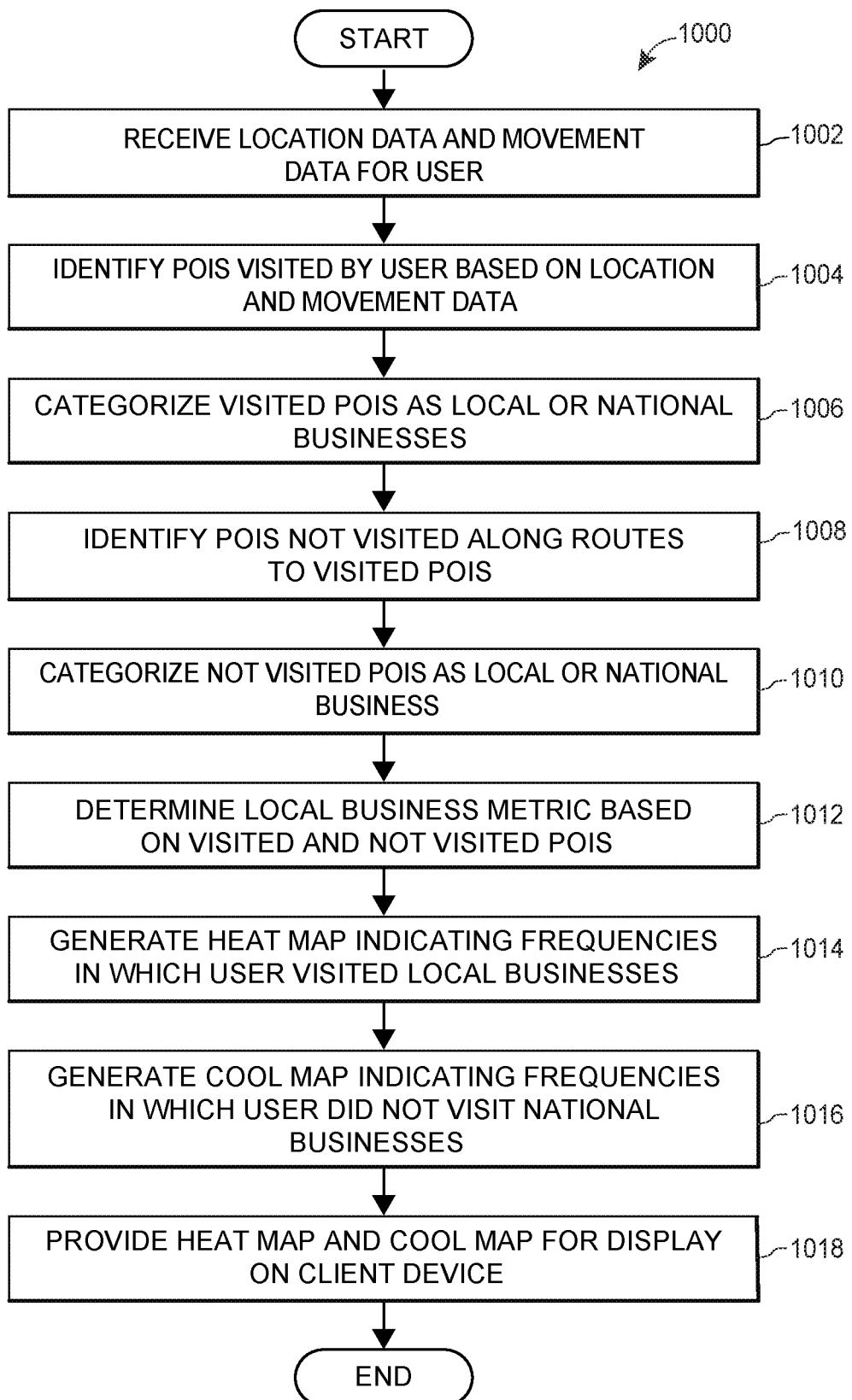
FIG. 10 illustrates a flow diagram representing an example method for identifying local businesses visited by a user which can be implemented by the server device.

FIG. 10 depicts a flow diagram representing an example method 1000 for identifying local businesses visited by a user. The method 1000 may be executed on the local business server 102. In some embodiments, the method 1000 may be implemented in a set of instructions stored on a non-transitory computer-readable memory and executable on one or more processors of the local business server 102. For example, the method 1000 may be at least partially performed by the local business scoring module 134 as shown in FIG. 1.

At block 1002, the local business server 102 receives location data and movement data for a user from the user's client computing device 106-116. The location data may include position data from a GPS included in the client computing device 106-116, and the movement data may include acceleration or speed data from an accelerometer, a gyroscope, a compass, etc., included in the client computing device 106-116. The client computing device 106-116 may provide updated location data and/or movement data to the local business server 102 periodically (e.g., every second, every ten seconds, every 30 seconds, every minute, etc.), when the position of the client computing device 106-116 changes by more than a threshold distance, or when the movement data indicates an acceleration which is greater than a threshold acceleration.

In any event, at block 1004, the local business server 102 analyzes the location and movement data to identify POIs visited by the user. For example, the local business server 102 may obtain map data from a map database and compare GPS coordinates from the location data to the GPS coordinates of POIs in the map database. In another example, the local business server 102 may invoke a mapping API to obtain a POI corresponding to a set of GPS coordinates. In some embodiments, the local business server 102 may determine that the user visited the POI based on the amount of time in which the user was at the POI or within a threshold distance of the POI. If the user was within a threshold distance of the POI for more than a threshold duration, the local business server 102 may determine that the user visited the POI.

In addition to receiving location and movement data from the user's client computing device 106-116, the local business server 102 may also obtain additional information to corroborate that the user went to a particular POI. This additional information may include an online check-in at the particular POI, a review of the particular POI, a social media post involving the particular POI, a financial statement indicating a purchase at the particular POI, etc. To obtain this information, the user may share social media data and/or financial data with the local business server 102, and the local business server 102 may subscribe to a feed for the user. The local business server 102 may then analyze the user's online check-ins, reviews, social media posts, and/or financial statements and their corresponding dates and times to verify that the user visited the POI detected by the client computing device 106-116 sensors. If the user visited a different POI than the POI determined from the sensor data, the local business server 102 may remove the POI from a list of POIs visited by the user.

For each POI visited by the user, the local business server 102 determines whether the POI is a local business or a national/global business (block 1006). The local business server 102 may determine whether the POI is a local business or national/global business based on the number of retail locations for the business corresponding to the POI and/or the geographic range of the retail locations. If the business corresponding to the POI has less than a threshold number of retail locations (e.g., three, five, seven, etc.), or each of the locations for the business corresponding to the POI are within a threshold geographic range (e.g., the same city, the same state, within a 100 mile radius, etc.), the local business server 102 may determine that the POI is a local business. Otherwise, the local business server 102 may determine that the POI is a national/global business. In some embodiments, the local business server 102 determines whether a POI is a local business based on any suitable combination of the number of retail locations and/or the geographic range of the retail locations. For example, the local business server 102 may generate a score by aggregating, weighting, multiplying, or combining the number of retail locations and/or the geographic range of the retail locations for a business in any suitable manner.

The local business server 102 may also determine whether the POI is a local business or a national/global business based on any suitable combination of the number of employees for the business corresponding to the POI, an amount of revenue for the business corresponding to the POI, content included in reviews of the POI, etc. In some embodiments, the local business server 102 may store indications of sizes of POIs and the type of businesses for the POIs in a separate business database, and may obtain the size of a POI and/or the type of business for a POI from the business database.

Then, at block 1008, for each POI, the local business server 102 may identify a route the user travelled along to reach the POI (the destination location) by determining that a starting location is the previous location in which the user stayed for more than a threshold duration. The local business server 102 may then construct the route by using locations in between the starting location and the destination location which the user passed for less than a threshold duration. The local business server 102 may also obtain navigation data from a navigation database or may invoke a navigation API to retrieve the navigation data. Using the identified routes, the local business server 102 may identify POIs the user passed over and did not visit on the way to the visited POIs. The POIs that the user passed over and did not visit may be POIs within a threshold distance of each route (e.g., within one mile, two miles, five miles, ten miles, etc.). In some embodiments, the local business server 102 may determine the type of business for the destination POI and may identify POIs the user passed over which are the same type of business as the destination POI.

At block 1010, the local business server 102 determines whether each POI the user passed over and did not visit is a local business or a national/global business. Then the local business server may generate local business metrics based on the POIs the user visited and the POIs the user did not visit over a particular time period (block 1012). The local business metrics may include a local business frequency, a national business frequency, a local business passing frequency, a national business passing frequency, and a local business score.

The local business frequency may be based on the number of times a user visits local businesses within a particular time interval (e.g., within a day, a week, a month, a year, etc.), or may be the average number of times a user visits local businesses within the particular time interval (e.g., the user averages 3.4 visits per week to local businesses). The national business frequency may be based on the number of times a user visits national businesses within a particular time interval (e.g., within a day, a week, a month, a year, etc.), or may be the average number of times a user visits national businesses within the particular time interval (e.g., the user averages 5.6 visits per week to national businesses).

The local business passing frequency may be based on the number of times a user passes over and does not visit a local business within a particular time interval (e.g., within a day, a week, a month, a year, etc.), or may be the average number of times a user passes over and does not a local business within the particular time interval (e.g., the user passes over an average of 7.2 local businesses per week). In some embodiments, the number of times a user passes over and does not visit a local business within a particular time interval may only include local businesses passed over for a national/global business. If the user visits another local business then the local business is not included in the count of local businesses being passed over within the particular time interval. Also in some embodiments, the number of times a user passes over and does not visit a local business within a particular time interval may only include local businesses which were passed over and are the same type of business as the visited business.

The national business passing frequency may be based on the number of times a user passes over and does not visit a national business within a particular time interval (e.g., within a day, a week, a month, a year, etc.), or may be the average number of times a user passes over and does not a national business within the particular time interval (e.g., the user passes over an average of 12.3 national businesses per week). In some embodiments, the number of times a user passes over and does not visit a national business within a particular time interval may only include national businesses passed over for a local business. If the user visits another national business then the national business is not included in the count of national businesses being passed over within the particular time interval. Also in some embodiments, the number of times a user passes over and does not visit a national business within a particular time interval may only include national businesses which were passed over and are the same type of business as the visited business.

The local business score for the user may be based on any suitable combination of the local business frequency, the national business frequency, the local business passing frequency, and/or the national business passing frequency. In some embodiments, the local business server 102 may increase the local business score according to the local business frequency and the national business passing frequency, and may decrease the score according to the national business frequency and the local business passing frequency. The local business score may also be a weighted combination of the local business frequency, the national business frequency, the local business passing frequency, and/or the national business passing frequency. The local business server 102 may also adjust the local business score based on the amount in which a user changes her habits from one time interval to the next. For example, a user who significantly increases her local business frequency and national business passing frequency from one week or month to the next may receive a higher increase in her local business score than a user who starts off with a high local business frequency and national business passing frequency but maintains similar frequencies in the subsequent time interval.

Still further, the local business server 102 may adjust the local business score according to the geographic area for the user. For example, some users may be located in densely populated areas with more opportunities to visit national businesses, such as cities. Other users may be located in sparsely populated areas with less opportunities to visit national businesses and a higher concentration of local businesses, such as small towns. Accordingly, the local business server 102 may adjust the local business score to account for the number of local business and national businesses in the user's geographic area or the ratio of local businesses to national businesses in the user's geographic area. For example, the local business server 102 may generate the local business score based on the difference between the local business frequency for the user and local business frequencies for other users in the same geographic area.

Moreover, the local business server 102 may adjust the local business score according to other user characteristics included in the user's profile. For example, the local business server 102 may adjust the local business score according to demographic data such as the age group in which the user belongs. The local business server 102 may analyze the local business metrics including the local business frequency, the national business frequency, the local business passing frequency, and the national business passing frequency for users in different age groups (e.g., ages 21-30, 31-40, 41-50, etc.), and may adjust the local business score for the user according to the user's age group.

In addition to generating local business metrics, the local business server 102 may generate a heat map indicating frequencies in which the user visited various POIs over a particular time period, and a cool map indicating frequencies in which the user passed over POIs on her way to visit other POIs over a particular time period (blocks 1014 and 1016). In some embodiments, the heat map and/or cool map are generated based on local business metrics for the user from the most recent time period or over several time periods. In other embodiments, the heat map and/or cool map are generated based on changes in local businesses from one time interval to the next.

Then at block 1018, the local business server 102 may provide the local business metrics, the heat map, and/or the cool map for display on a user interface of the user's client computing device 106-116. The local business metrics, the heat map, and/or the cool map may be presented on separate screens, or may be presented in a single screen.

Figure 11:
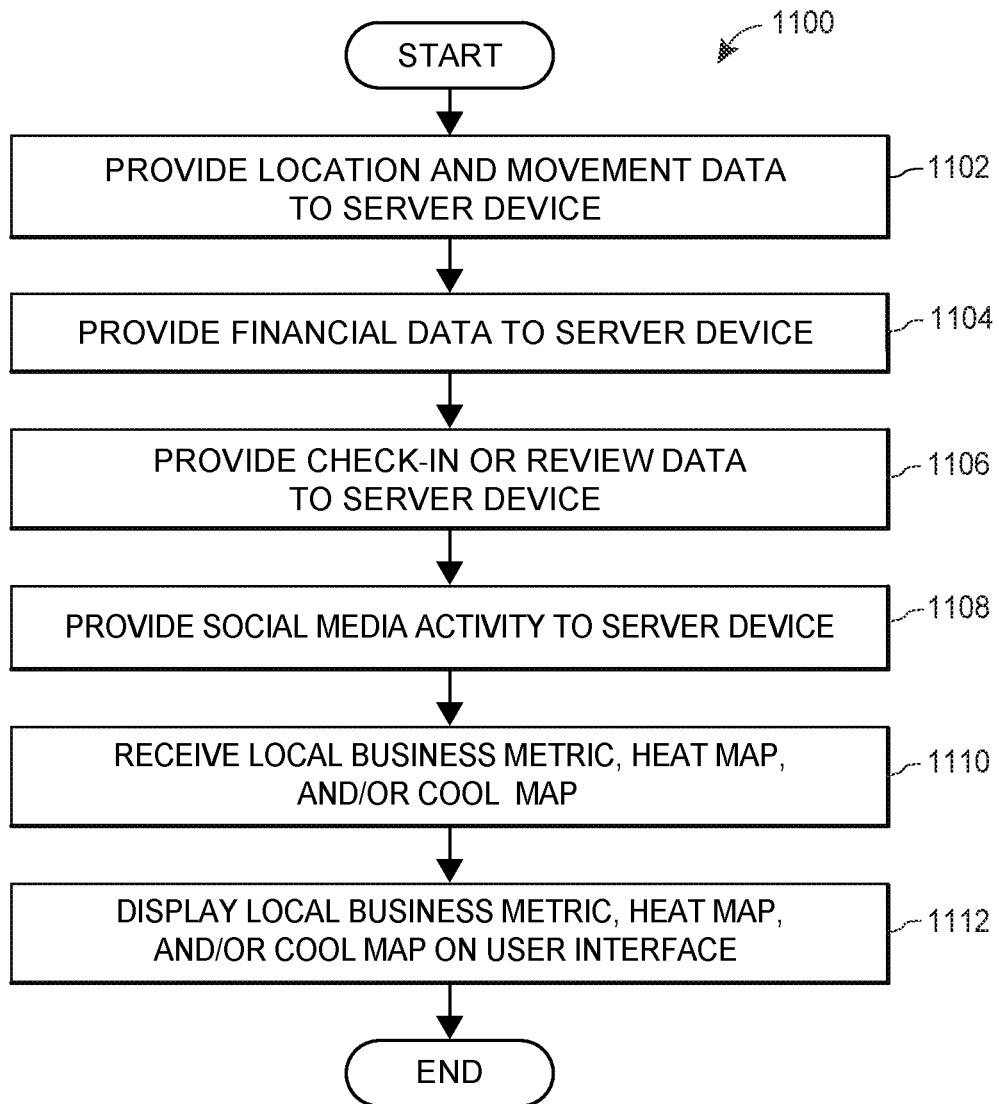
FIG. 11 illustrates a flow diagram representing an example method for presenting local businesses visited by a user which can be implemented by the client device.

FIG. 11 depicts a flow diagram representing an example method 1100 for presenting local businesses visited by a user. The method 1100 may be executed on the client computing device 106-116. In some embodiments, the method 1100 may be implemented in a set of instructions stored on a non-transitory computer-readable memory and executable on one or more processors of the client computing device 106-116. For example, the method 1100 may be at least partially performed by the client application 266 as shown in FIG. 2B.

At block 1102, the client computing device 106-116 may provide location data and movement data to a server device. The location data may include position data from a GPS included in the client computing device 106-116, and the movement data may include acceleration or speed data from an accelerometer, a gyroscope, a compass, etc., included in the client computing device 106-116. The client computing device 106-116 may provide updated location data and/or movement data to the local business server 102 periodically (e.g., every second, every ten seconds, every 30 seconds, every minute, etc.), when the position of the client computing device 106-116 changes by more than a threshold distance, or when the movement data indicates an acceleration which is greater than a threshold acceleration.

In some embodiments, the client computing device 106-116 may also provide financial data (block 1104), check-in and/or review data (block 1106), and/or social media data (block 1108) to the server device. This may include an online check-in at the particular POI, a review of the particular POI, a social media post involving the particular POI, a financial statement indicating a purchase at the particular POI, etc. To provide this information, the user may share social media data and/or financial data with the server device, and the server device may subscribe to a feed for the user or access the data via an API.

Then at block 1110, the client computing device 106-116 may receive local business metrics from the server device based on the location data, the movement data, the financial data, the check-in and/or review data, and/or the social media data from the user. The local business metrics may include a local business frequency, a national business frequency, a local business passing frequency, a national business passing frequency, and/or a local business score. Additionally, the client computing device 106-116 may receive a heat map and/or cool map from the server device (or heat map or cool map data for presenting the heat map and/or cool map on the client computing device 106-116) indicating frequencies in which the user visited various POIs over a particular time period, and indicating frequencies in which the user passed over POIs on her way to visit other POIs over a particular time period.

At block 1112, the client computing device 106-116 may present the local business metrics, the heat map, and/or the cool map on a user interface. The local business metrics, the heat map, and/or the cool map may be presented on separate screens, or may be presented in a single screen.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as example only and does not describe every possible embodiment, as describing every possible embodiment would be impractical, if not impossible. One could implement numerous alternate embodiments, using either current technology or technology developed after the filing date of this application.

We claim:

1. A method for identifying local businesses visited by a user, the method executed by one or more processors programmed to perform the method, the method comprising:
   receiving, at one or more processors, location data and movement data for a user over a time period;
   analyzing, by the one or more processors, the location and movement data to identify one or more points of interest (POIs) visited by the user during the time period;
   for each of the one or more POIs, determining, by the one or more processors, whether the POI is a local business having less than a threshold number of retail locations;
   for each local business visited by the user, identifying, by the one or more processors, national/global businesses which the user did not visit along a route to the local business;
   generating, by the one or more processors, a local business metric for the user according to the one or more POIs visited by the user during the time period including the local businesses visited by the user and the national/global businesses which the user did not visit along the routes to the local businesses, wherein the local business metric is increased based on the user visiting the local businesses, wherein the local business metric is increased based on the user passing at least one of the national/global businesses along the routes to the local businesses;
   generating, by the one or more processors, a heat map including a digital map of a geographic area for the user during the time period and a plurality of indicators depicting local business frequencies in which the user visited the local businesses within the geographic area, each indicator of the plurality of indicators depicting a local business frequency in which the user visited a respective local business within the geographic area, the plurality of indicators overlaying locations of the local businesses within the geographic area in the digital map, wherein the plurality of indicators includes a first indicator corresponding to a local business frequency above a first threshold frequency, wherein the plurality of indicators includes a second indicator corresponding to a local business frequency above a second threshold frequency, wherein the plurality of indicators includes a third indicator corresponding to a local business frequency above a third threshold frequency, wherein the first indicator, the second indicator, and the third indicator are different from each other; and
   providing, by the one or more processors, the heat map for display on a client device of the user.

2. The method of claim 1, further comprising:
   generating, by the one or more processors, a reverse heat map depicting frequencies in which the user did not visit national/global businesses along the routes to the local businesses; and
   providing, by the one or more processors, the reverse heat map for display on the client device.

3. The method of claim 1, wherein generating a local business metric for the user according to the one or more POIs visited by the user during the time period includes:
   increasing, by the one or more processors, the local business metric based on the number of local businesses visited by the user and the number of national/ global businesses which the user did not visit along the routes to the local businesses; and decreasing, by the one or more processors, the local business metric based on the number of national/global businesses visited by the user and the number of local businesses which the user did not visit along the routes to the national/global businesses.

4. The method of claim 3, wherein generating a local business metric for the user according to the one or more POIs visited by the user during the time period further includes:

determining, by the one or more processors, a frequency at which the user selected local businesses over national/global businesses during the time period;

obtaining, by the one or more processors, frequencies in which other users in a same geographic area as the user selected local business over national/global businesses; and generating, by the one or more processors, the local business metric for the user based on a difference between the frequency at which the user selected local businesses over national/global businesses during the time period and the frequencies in which other users in the same geographic area as the user selected local business over national/global businesses.

5. The method of claim 1, wherein identifying national/global businesses which the user did not visit along a route to the local business includes:

identifying, by the one or more processors, a route taken by the user from a starting location to one of the one or more POIs based on the location and movement data;

identifying, by the one or more processors, locations of national/global businesses within a geographic area encompassing the route;

determining, by the one or more processors, an amount of time in which the user was located within a threshold distance of the locations of the national/global businesses within the geographic area encompassing the route; and for each of the locations of the national/global businesses, determining, by the one or more processors, that the user did not visit the national/global business in response to determining that the user was located within the threshold distance of the national/global business for less than a threshold amount of time.

6. The method of claim 5, wherein identifying national/global businesses which the user did not visit along a route to the local business further includes:

determining, by the one or more processors, a type of business for the local business and for the national/global businesses within the geographic area encompassing the route; and for each of the locations of the national/global businesses determining, by the one or more processors, that the user did not visit the national/global business in response to determining that the user was located within the threshold distance of the national/global business for less than a threshold amount of time and the type of business for the national/global business is the same as the type of business for the local business.

7. The method of claim 1, wherein determining whether the POI is a local business includes:

determining, by the one or more processors, whether the POI is a local business based on at least one of:

obtaining an indication of a number of locations for a business associated with the POI, obtaining indications of each of the locations for the business associated with the POI and identifying an area which encompasses each of the locations, obtaining an indication of a number of employees of the business associated with the POI, obtaining reviews of the business associated with the POI and analyzing content included in the reviews, or obtaining an indication of an amount of revenue for the business associated with the POI.

8. The method of claim 1, wherein analyzing the location and movement data to identify one or more POIs visited by the user includes:

comparing, by the one or more processors, the location data to locations of POIs;

in response to identifying that the location data corresponds to the location of one or more the POIs, determining, by the one or more processors, an amount of time in which the user was located within a threshold distance of the POI; and determining, by the one or more processors, that the user visited the POI in response to determining that the user was located within the threshold distance of the POI for more than a threshold amount of time.

9. The method of claim 8, wherein identifying one or more POIs visited by the user further includes:

receiving, at the one or more processors, an indication that the user visited the POI including at least one of:

a financial statement indicating the user made a purchase at the POI;

a check-in or review of the POI; or a social media post indicating the user's presence at the POI.

10. The method of claim 1, wherein receiving location data and movement data for a user includes:

receiving, at the one or more processors, positioning data from a positioning sensor included in the client device; and receiving, at the one or more processors, acceleration data from an accelerometer included in the client device.

11. A computing device for identifying local businesses visited by a user, the computing device comprising:

one or more processors; and a non-transitory computer-readable memory coupled to the one or more processors, and storing thereon instructions that, when executed by the one or more processors, cause the computing device to:

receive location data and movement data for a user over a time period;

analyze the location and movement data to identify one or more points of interest (POIs) visited by the user during the time period;

for each of the one or more POIs, determine whether the POI is a local business having less than a threshold number of retail locations;

for each local business visited by the user, identify national/global businesses which the user did not visit along a route to the local business;

generate a local business metric for the user according to the one or more POIs visited by the user during the time period including the local businesses visited by the user and the national/global businesses which the user did not visit along the routes to the local businesses, wherein the local business metric is increased based on the user visiting the local businesses, wherein the local business metric is increased based on the user passing at least one of the national/global businesses along the routes to the local businesses;

generate a heat map including a digital map of a geographic area for the user during the time period and a plurality of indicators depicting local business frequencies in which the user visited the local businesses within the geographic area, each indicator of the plurality of indicators depicting a local business frequency in which the user visited a respective local business within the geographic area, the plurality of indicators overlaying locations of the local businesses within the geographic area in the digital map, wherein the plurality of indicators includes a first indicator corresponding to a local business frequency above a first threshold frequency, wherein the plurality of indicators includes a second indicator corresponding to a local business frequency above a second threshold frequency, wherein the plurality of indicators includes a third indicator corresponding to a local business frequency above a third threshold frequency, wherein the first indicator, the second indicator, and the third indicator are different from each other; and provide the heat map for display on a client device of the user.

12. The computing device of claim 11, wherein the instructions cause the computing device to:

generate a reverse heat map depicting frequencies in which the user did not visit national/global businesses along the routes to the local businesses; and provide the reverse heat map for display on the client device.

13. The computing device of claim 11, wherein to generate a local business metric for the user according to the one or more POIs visited by the user during the time period, the instructions cause the computing device to:

increase the local business metric based on the number of local businesses visited by the user and the number of national/global businesses which the user did not visit along the routes to the local businesses; and decrease the local business metric based on the number of national/global businesses visited by the user and the number of local businesses which the user did not visit along the routes to the national/global businesses.

14. The computing device of claim 13, wherein to generate a local business metric for the user according to the one or more POIs visited by the user during the time period, the instructions further cause the computing device to:

determine a frequency at which the user selected local businesses over national/global businesses during the time period;

obtain frequencies in which other users in a same geographic area as the user selected local business over national/global businesses; and generate the local business metric for the user based on a difference between the frequency at which the user selected local businesses over national/global businesses during the time period and the frequencies in which other users in the same geographic area as the user selected local business over national/global businesses.

15. The computing device of claim 11, wherein to identify national/global businesses which the user did not visit along a route to the local business, the instructions cause the computing device to:

identify a route taken by the user from a starting location to one of the one or more POIs based on the location and movement data;

identify locations of national/global businesses within a geographic area encompassing the route;

determine an amount of time in which the user was located within a threshold distance of the locations of the national/global businesses within the geographic area encompassing the route; and for each of the locations of the national/global businesses, determine that the user did not visit the national/global business in response to determining that the user was located within the threshold distance of the national/global business for less than a threshold amount of time.

16. The computing device of claim 15, wherein to identify national/global businesses which the user did not visit along a route to the local business, the instructions further cause the computing device to:

determine a type of business for the local business and for the national/global businesses within the geographic area encompassing the route; and for each of the locations of the national/global businesses determine the user did not visit the national/global business in response to determining that the user was located within the threshold distance of the national/global business for less than a threshold amount of time and the type of business for the national/global business is the same as the type of business for the local business.

17. The computing device of claim 11, wherein to analyze the location and movement data to identify one or more POIs visited by the user, the instructions cause the computing device to:

compare the location data to locations of POIs;

in response to identifying that the location data corresponds to the location of one or more the POIs, determine an amount of time in which the user was located within a threshold distance of the POI; and determine that the user visited the POI in response to determining that the user was located within the threshold distance of the POI for more than a threshold amount of time.

18. A non-transitory computer-readable memory storing thereon instructions that, when executed by one or more processors, cause the one or more processors to:

receive location data and movement data for a user over a time period;

analyze the location and movement data to identify one or more points of interest (POIs) visited by the user during the time period;

for each of the one or more POIs, determine whether the POI is a local business having less than a threshold number of retail locations;

for each local business visited by the user, identify national/global businesses which the user did not visit along a route to the local business;

generate a local business metric for the user according to the one or more POIs visited by the user during the time period including the local businesses visited by the user and the national/global businesses which the user did not visit along the routes to the local businesses, wherein the local business metric is increased based on the user visiting the local businesses, wherein the local business metric is increased based on the user passing at least one of the national/global businesses along the routes to the local businesses;

generate a heat map including a digital map of a geographic area for the user during the time period and indicators depicting local business frequencies in which the user visited the local businesses within the geographic area, each indicator of the plurality of indicators depicting a local business frequency in which the user visited a respective local business within the geographic area, the plurality of indicators overlaying locations of the local businesses within the geographic area in the digital map, wherein the plurality of indicators includes a first indicator corresponding to a local business frequency above a first threshold frequency, wherein the plurality of indicators includes a second indicator corresponding to a local business frequency above a second threshold frequency, wherein the plurality of indicators includes a third indicator corresponding to a local business frequency above a third threshold frequency, wherein the first indicator, the second indicator, and the third indicator are different from each other; and provide the heat map for display on a client device of the user.

19. The computer-readable memory of claim 18, wherein the instructions cause the one or more processors to:

generate a reverse heat map depicting frequencies in which the user did not visit national/global businesses along the routes to the local businesses; and provide the reverse heat map for display on the client device.

20. The computer-readable memory of claim 18, wherein to identify national/global businesses which the user did not visit along a route to the local business, the instructions cause the one or more processors to:

identify a route taken by the user from a starting location to one of the one or more POIs based on the location and movement data;

identify locations of national/global businesses within a geographic area encompassing the route;

determine an amount of time in which the user was located within a threshold distance of the locations of the national/global businesses within the geographic area encompassing the route; and for each of the locations of the national/global businesses, determine that the user did not visit the national/global business in response to determining that the user was located within the threshold distance of the national/global business for less than a threshold amount of time.

* * * * *